(12) United States Patent
Laghi et al.

(10) Patent No.: US 7,222,703 B2
(45) Date of Patent: *May 29, 2007

(54) APPARATUS FOR CONTROLLING HYDRAULIC BRAKES IN BICYCLES, MOTORBICYCLES AND THE LIKE

(75) Inventors: Samuele Laghi, Prato (IT); Andrea Fiorenzo Becocci, Prato (IT)

(73) Assignee: Formula S.R.L. (IT)

( * ) Notice: Subject to any disclaimer, the term of this patent is extended or adjusted under 35 U.S.C. 154(b) by 49 days.

This patent is subject to a terminal disclaimer.

(21) Appl. No.: 10/925,275

(22) Filed: Aug. 24, 2004

(65) Prior Publication Data

US 2005/0056110 A1 Mar. 17, 2005

(30) Foreign Application Priority Data

Sep. 15, 2003 (IT) .............................. FI03A0242

(51) Int. Cl.
*B60T 11/00* (2006.01)

(52) U.S. Cl. ................. 188/344; 188/151 R; 60/593

(58) Field of Classification Search ............ 188/24.15, 188/344, 151 R, 358, 359; 60/593, 594, 60/584; 74/500.5, 502
See application file for complete search history.

(56) References Cited

U.S. PATENT DOCUMENTS

| | | | |
|---|---|---|---|
| 4,501,340 A * | 2/1985 | Yoshida ..................... 180/219 |
| 4,560,049 A * | 12/1985 | Uchibaba et al. ......... 192/85 R |
| 4,635,442 A * | 1/1987 | Bass ........................... 60/594 |
| 4,779,482 A * | 10/1988 | Kawaguchi .................. 74/523 |
| 4,840,082 A * | 6/1989 | Terashima et al. ............ 74/523 |
| 5,678,665 A | 10/1997 | Debreczeni |
| 6,119,821 A | 9/2000 | Chiang |
| 6,336,327 B1 * | 1/2002 | Noro et al. ................... 60/533 |
| 6,688,440 B2 * | 2/2004 | Matsushita et al. ......... 188/344 |
| 6,739,133 B2 * | 5/2004 | Barnett ........................ 60/594 |
| 6,804,961 B2 * | 10/2004 | Lumpkin ...................... 60/588 |
| 6,871,729 B2 * | 3/2005 | Huster et al. ............ 188/24.11 |
| 2003/0183038 A1 | 10/2003 | Cornolti et al. |
| 2005/0056508 A1 * | 3/2005 | Laghi ......................... 188/344 |

FOREIGN PATENT DOCUMENTS

| | | |
|---|---|---|
| EP | 1325863 A1 | 7/2003 |
| EP | 1514791 A1 | 3/2005 |
| IT | 0218037 | 12/1988 |
| WO | WO 2005/087574 A1 | 3/2005 |

OTHER PUBLICATIONS

Hayes El Camino '05 Disc Brake Review, 6 pages; Hayes "U" University, 7 pages; and Hayes El Camino Hydraulic Disc Brake system, 3 figures.*

* cited by examiner

*Primary Examiner*—James McClellan
*Assistant Examiner*—Mariano Sy
(74) *Attorney, Agent, or Firm*—McGlew and Tuttle P.C.

(57) ABSTRACT

Apparatus for controlling brakes in bicycles and the like, made with a pump connected to a relevant reservoir, characterized in that the reservoir is disposed inside a containment body and exhibits a concave portion shaped complementarily to a handlebar's portion to which the body is to be fixed.

24 Claims, 4 Drawing Sheets

APPARATUS FOR CONTROLLING HYDRAULIC BRAKES IN BICYCLES, MOTORBICYCLES AND THE LIKE

The present invention relates to an apparatus for controlling hydraulic brakes in bicycles, motorcycles and the like.

It is known that in a hydraulic disc brake for bicycles or motorcycles, the action exerted on the brake's lever is transmitted to the caliper acting on the disc via a hydraulic connection which exerts on the same caliper a force generated by a pump activated by said lever.

A drawback exhibited by the traditional brake-controlling devices relates to the fact that the reservoir of the brake's pump, usually held in a body of cylindrical shape, is applied to the handlebar, thereby making up an element by itself. This characteristic may result unsuitable inasmuch as it brings about larger dimensions of the handlebar, the said reservoir making up a component that can be damaged by collisions and tampering and being a danger for the user in case of falls.

A further drawback of the devices which control the hydraulic brakes of known type lies in the relative difficulty of adjusting the idle stroke of the control lever. In fact, in the existing-devices, the lever is connected to a piston sliding into a respective chamber exhibited by the pump. In order to adjust the idle stroke of the lever it is currently necessary to move axially the piston with respect to the chamber inside which it slides. This approach is however very complex constructionally and affects negatively the constructional simplicity of the device and its robustness upon use, besides raising the relevant production cost thereof.

The main object of the present invention is to eliminate the drawbacks deriving from the exposure of the reservoirs to possible collisions and/or tampering. A further object of the present invention is to provide a brake-controlling apparatus which can be easily adjusted.

This result has been achieved, according to the invention, by adopting the idea of making an apparatus having the characteristics disclosed in apparatus for controlling brakes in bicycles and the like, comprising a pump connected with a relevant reservoir for a fluid of a hydraulic circuit of the apparatus, wherein the reservoir is disposed inside a containment body and exhibits a concave portion shaped complementarily to a handlebar's portion to which the body is to be fixed, the concave portion making up a lid of the reservoir.

Further characteristics being set forth in the apparatus described above, wherein the apparatus comprises a semi-collar facing the concave portion and having a concavity of a confirmation suited for complementarily matching the handlebar's portion on the side opposite to the concave portion of the body.

Further characteristics being set forth in the apparatus described above, in which the pump comprises a piston sliding within a relevant chamber provided with one or more ports for connection to the reservoir, the piston being shaped as to close the ports upon its displacement along the chamber, the apparatus being characterized in that the idle stroke of the piston inside the chamber is adjustable by a rotation of the piston about its longitudinal axis.

Further characteristics being set forth in the apparatus described above, in which the piston is provided with a gasket able to close the ports upon the stroke of the piston along the chamber, the apparatus being characterized In that the gasket has a circumferential development with differentiated height so as to offer, upon a rotation of piston about the longitudinal axis of the piston itself, a different front of interaction with the ports.

Further characteristics being set forth in the apparatus described above, characterized in that the piston is provided with an operable knob allowing the rotation thereof relative to the chamber.

Further characteristics being set forth in the apparatus described above, characterized in that the piston is connected with a lever for the actuation of the pump via a connecting rod having spherical head.

Further characteristics being set forth in the apparatus described above, characterized in that the piston is provided with an operable knob allowing the rotation thereof relative to the chamber.

Further characteristics being set forth in the apparatus described above, characterized in that the piston is connected with a lever for the actuation of the pump via a connecting rod having spherical head Among the advantages of the present invention there is the fact that no protruding parts are provided which can be damaged or be a danger for the cyclist; that the apparatus has extremely limited overall dimensions and, therefore, gives the handlebar a greater compactness; that a more attractive appearance is conferred to the handlebar; that it is possible to adjust the idle stroke of the lever with greatest ease; that the braking maintains optimal performance; that the apparatus keeps its characteristics unchanged also after a prolonged service life.

These and other advantages and characteristics of the invention will be best understood by anyone skilled in the art from a reading of the following description in conjunction with the attached drawings given as a practical exemplification of the invention, but not to be considered in a limitative sense, wherein.

Figure 1:
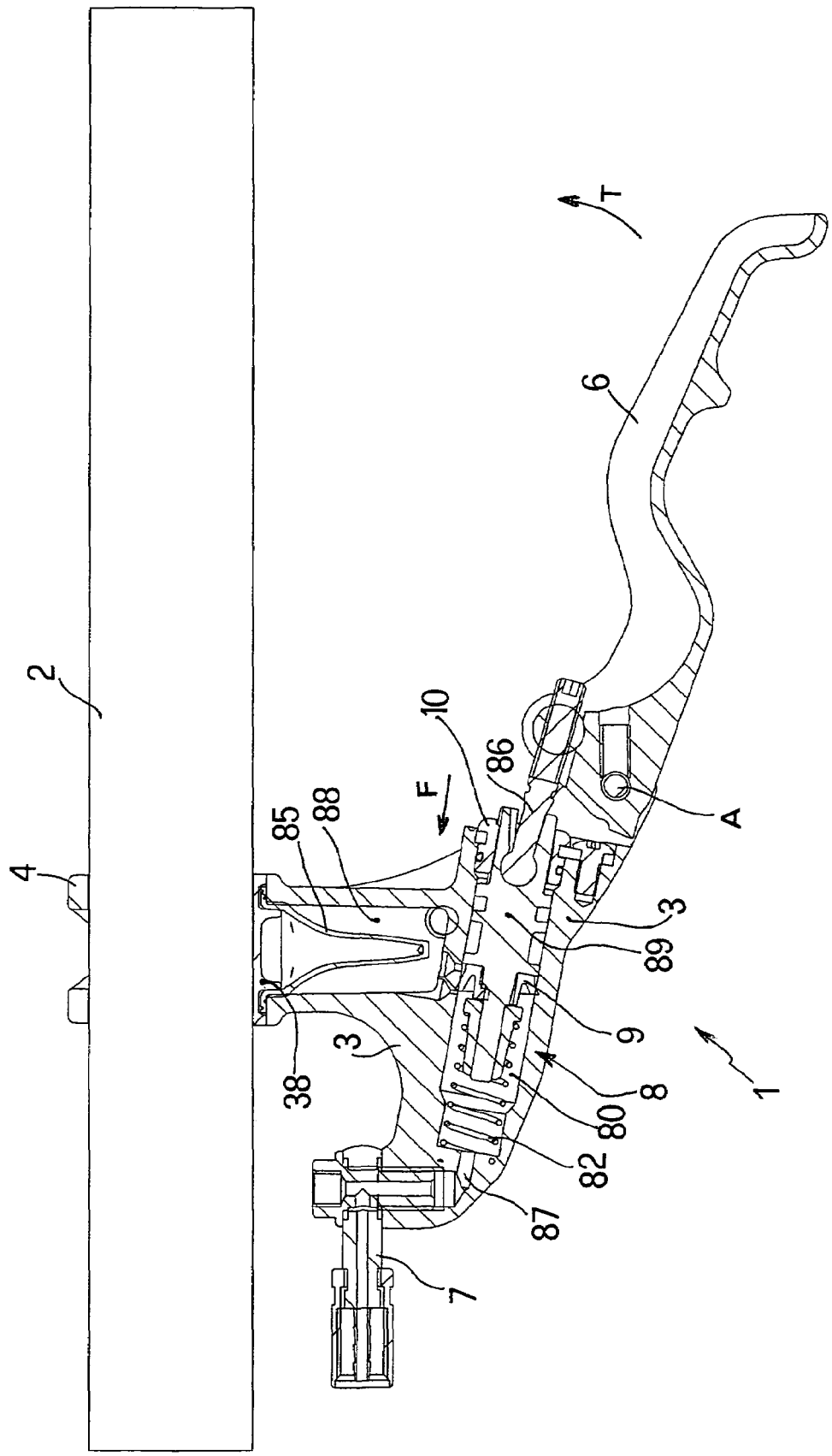
FIG. 1 shows a view in longitudinal section of a possible exemplary embodiment of an apparatus for controlling hydraulic brakes according to the invention, in association with a portion of the handlebar.

With reference to the example shown in the attached figures, an apparatus 1 according to the present invention can be associated with a bicycle's handlebar represented in FIG. 1 by a portion of a tubular body 2. The present apparatus comprises a body 3 having concave, substantially semi cylindrical surface 30 and so shaped as to be complementary with the profile of the tubular element of the handlebar 2. On the body 3, on either side of said surface 30, there are provided seats 39 for receiving corresponding screws 5 allowing the attachment of the apparatus 1 to the handlebar 2. The apparatus 1 also comprises a semi collar 4 having a concavity 40 of substantially semi cylindrical shape so as to fit complementarily with the handlebar 2. Provided on the semi collar 4 are through holes to receive screws 5 for the engagement of the semi collar 4 and the body 3, thereby determining a stable attachment of the apparatus 1 to the handlebar 2.

As best described later on with reference to the example illustrated by the figures of the accompanying drawings, the said body 3 comprises a cavity 88 defining a reservoir for the fluid of the hydraulic circuit. The said reservoir 88 results positioned between the handlebar, to which the body 3 is ensured, and a brake-operating lever 6.

The apparatus 1 further comprises a lever 6 for the operation of the pump acting on the hydraulic circuit of the braking system. The lever 6 is pivoted to the body 3 in correspondence of the axis indicated by A in FIG. 1. In the figures, a conduit 7 can be seen which makes part of the hydraulic circuit and connects the apparatus 1 to the caliper (not shown) acting on the brake's disc. The conduit 7 is connected downstream of a pump 8 to an outlet port 87 through which the fluid is forced into the hydraulic circuit upon activation of the brake. The pump 8 is defined by a chamber 80 within the body 3, and inside which a piston 89 is made to slide. The piston 89 is connected to the lever 6 via a connecting rod 86 having spherical head and located, with respect to the piston, on the side opposite to that in which the port 87 is positioned within the chamber 80. The actuation of the lever 6 (as indicated by the arrow T in FIG. 1) is cause for the displacement of the piston 89 (from the right to the left, with reference to arrow F in FIG. 1) towards the port 87. The return of the piston 89 to the rest position is determined by a spring 82 whose reaction is exerted in a direction opposite to that indicated by arrow F in FIG. 1.

Figure 2:
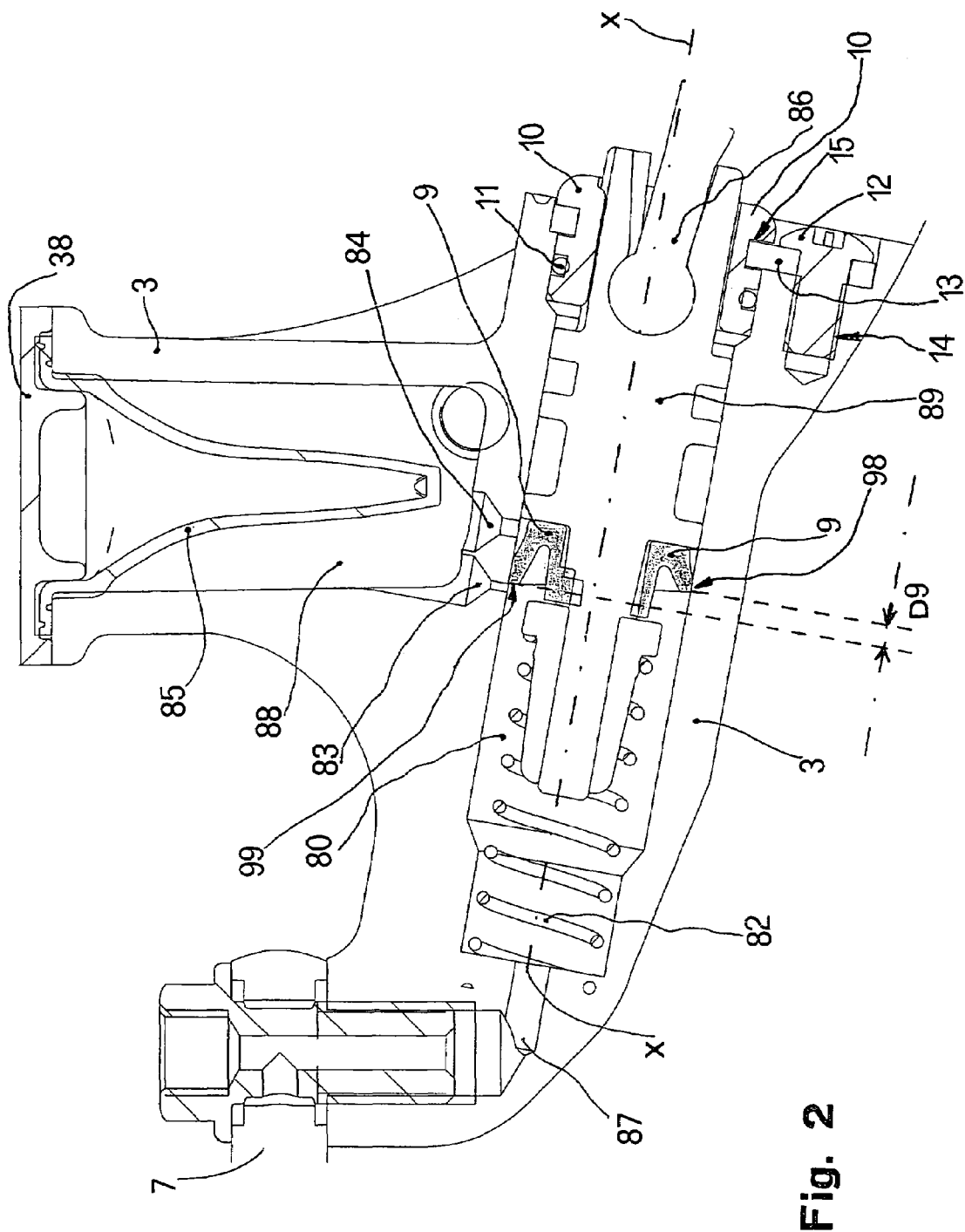
FIG. 2 is an enlarged detail of the embodiment of FIG. 1, in which some lines in the drawing have been omitted for the sake of simplicity.

As best visible in FIG. 2, keeping the piston 89 within the chamber 80 is ensured by the presence of the bush 10 provided with a relevant gasket 11. The bush is fixed to the body 3 of the apparatus by a screw 12. The screw 12 is screwed into a corresponding seat 14 provided in the body 3 and passed through a connecting drilled element 13 which is fitted in a groove 15 formed in the bush 10.

Figure 3:
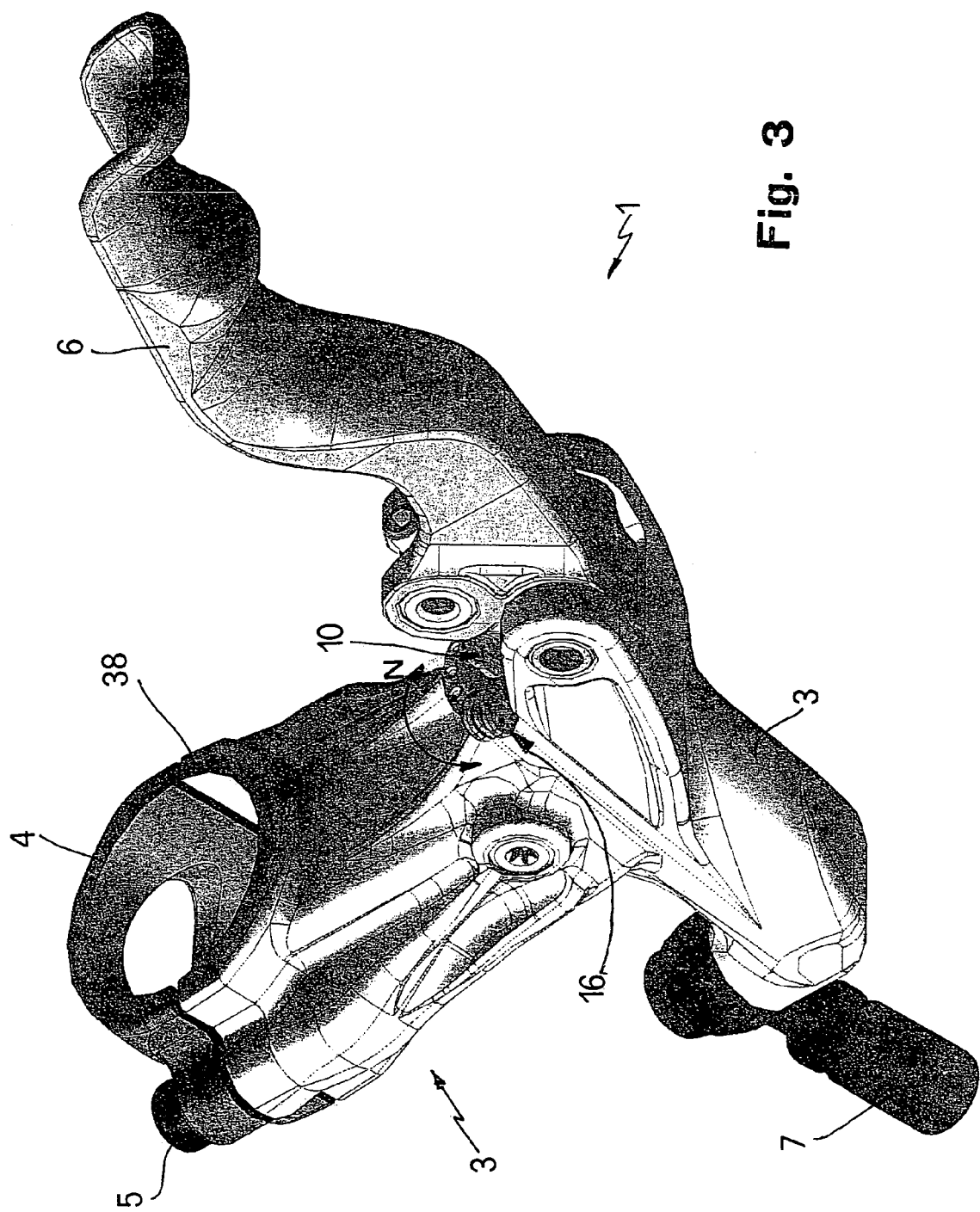
FIG. 3 is a perspective view from below of the apparatus of FIG. 1.
Figure 4:
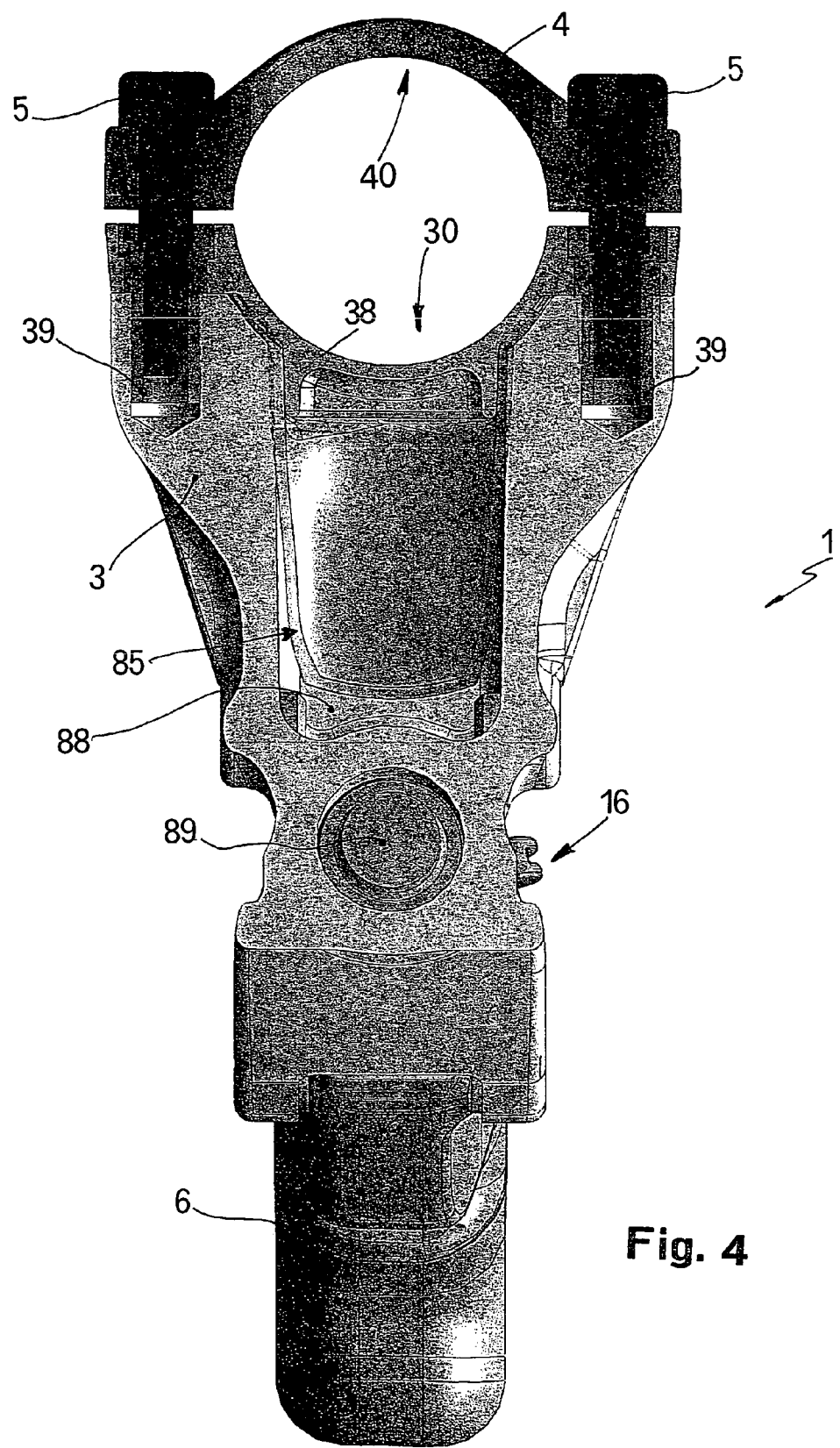
FIG. 4 is a cross-section view of the apparatus shown in the preceding figures.

The bush 10 is solid to the piston 89 and, for this reason, the piston 89 can rotate together with the bush 10 with respect to the chamber 80. Solid to the bush 10 is a knob 16 (shown in FIGS. 3 and 4) disposed radially to the longitudinal development of the chamber 80, that is, substantially orthogonal to the axis X-X of chamber 80. The rotation of the knob 16 (see arrow N in FIG. 3) causes a corresponding rotation of the piston 89 within the chamber 80.

The chamber 80 is connected with the said reservoir 88 via two ports 83 and 84, which are disposed in a region interested by the piston upon its sliding. Through the ports 83 and 84, in a manner known per se, the fluid is made to pass bisectionally between the reservoir 88 and the chamber 80 during the axial movement of the piston 89, that is, during the operation of the pump 8. Fitted on the piston 89 is a gasket 9 having circumferential development. The gasket 9 exhibits, along its circumferential profile, a variable extension in the axial direction. In practice, the gasket 9 has a height varying along its longitudinal development. In FIG. 2, D9. Indicates the difference in height between the extent of the overlying edge 99, and the corresponding extent of the underlying edge 98. In other words, the plane of said edges 98, 99 forms an acute angle, that is, an angle other than 90°, with said axis X-X.

This particular shaping of the gasket 9 is cause for a different interaction between the piston 89 and the ports 83, 84 of the reservoir 88. Stated differently, the interaction front of the gasket 9 with the ports 83 and 84 is displaced in the axial direction; in practice, by the rotation in one direction or in the opposite direction of piston 89 (obtainable through the knob 16), the gasket 9 closes either in advance or with delay the port 83, that is, before or after the braking command. An adjustment of the idle stroke of the lever 6 is thus obtained with an extremely simple and effective solution.

The reservoir 88 is defined by a corresponding cavity provided in the body 3 of the apparatus 1. Provided inside the reservoir 88 is a traditional, compensating rubber membrane 85. On top, the reservoir is closed by a lid 38. The lid 38 is crossed by screws 5 which fix the apparatus 1 to the handlebar 2.

Moreover, the confirmation of the lid 38 is concave, so as to complementarily match the profile of handlebar's tube 2.

This characteristic allows accommodating the reservoir 88 in a stable manner over a region protected against collisions and tampering.

Practically, the construction details may vary in any equivalent way as far as the shape, dimensions, elements disposition, nature of the used materials are concerned, without nevertheless departing from the scope of the adopted solution idea and, thereby, remaining within the limits of the protection granted to the present patent.

The invention claimed is:

1. An apparatus for controlling brakes in bicycles, comprising:
a pump connected with a relevant reservoir for a fluid of a hydraulic circuit of the apparatus, wherein said reservoir is disposed inside a containment body and exhibits an open concave portion with an open side facing opposite a handlebar portion, the entirety of said open side being connected to a lid shaped complementarily to the handlebar portion to which said body is to be fixed.

2. An apparatus according to claim 1, wherein said apparatus comprises a semicollar facing said concave portion and having a concavity of a confirmation suited for complementarily matching said handlebar's portion on the side opposite to said concave portion of said body.

3. An apparatus according to claim 1, in which said pump comprises a piston sliding within a relevant chamber provided with one or more ports for connection to said reservoir, said piston being shaped as to close said ports upon its displacement along said chamber, the apparatus being characterized in that an idle stroke of said piston inside said chamber is adjustable by a rotation of said piston about a longitudinal axis of said piston.

4. An apparatus according to claim 3, in which said piston is provided with a gasket able to close said ports upon the stroke of said piston along said chamber, the apparatus being characterized in that said gasket has a circumferential development with differentiated height so as to offer, upon a rotation of piston about the longitudinal axis of said piston itself, a different front of interaction with said ports.

5. An apparatus according to claim 3, wherein said piston is provided with an operable knob allowing the rotation thereof relative to said chamber.

6. An apparatus according to claim 3, wherein said piston is connected with a lever for the actuation of said pump via a connecting rod having a spherical head.

7. An apparatus according to claim 4, wherein said piston is provided with an operable knob allowing the rotation thereof relative to said chamber.

8. An apparatus according to claim 4, wherein said piston is connected with a lever for the actuation of said pump via a connecting rod having spherical head.

9. An apparatus according to claim 1, wherein said apparatus includes a lid adapted to said reservoir.

10. An apparatus according to claim 1, wherein said apparatus includes a concave-shaped lid to said reservoir.

11. A bike controlling assembly comprising:
a handlebar having a tubular body portion; and
an apparatus fixed to said handlebar for controlling brakes, said apparatus including a containment body, a reservoir disposed inside said containment body for filling a fluid of a hydraulic circuit of said apparatus, and a concave-shaped portion enclosing said reservoir and buttressing against said tubular body portion, and a pump connected with said reservoir, wherein said pump includes a piston sliding within a relevant chamber provided with one or more ports for connection to said reservoir, said piston being shaped as to close said ports upon its displacement along said chamber, wherein an idle stroke of said piston inside said chamber is adjustable by a rotation of said piston about a longitudinal axis of said piston.

12. A bike controlling assembly according to claim 11, wherein said apparatus includes a lid to said reservoir.

13. A bike controlling assembly according to claim 11, in which said piston is provided with a gasket able to close said ports upon the stroke of said piston along said chamber, wherein said gasket has a circumferential development with differentiated height so as to offer, upon a rotation of piston about the longitudinal axis of said piston itself, a different interactive front with said ports.

14. A bike controlling assembly according to claim 11, wherein said piston is provided with an operable knob allowing the rotation thereof relative to said chamber.

15. A bike controlling assembly according to claim 11, wherein said piston is connected with a lever for the actuation of said pump via a connecting rod having a spherical head.

16. A bike controlling assembly according to claim 13, wherein said piston is provided with an operable knob allowing the rotation thereof relative to said chamber.

17. A bike controlling assembly according to claim 13, wherein said piston is connected with a lever for the actuation of said pump via a connecting rod having spherical head. includes a concave-shaped lid adapted to said reservoir.

18. A bike controlling assembly according to claim 11, wherein said apparatus includes a concave-shaped lid adapted to said reservoir.

19. An apparatus for controlling brakes in a bicycle, the apparatus comprising:

a pump connected to other parts of the bicycle, the pump including a piston sliding within a relevant chamber;

a containment body attached to said pump and enclosing a reservoir for a fluid defining a hydraulic circuit of the apparatus, wherein said reservoir exhibits an open concave portion shaped complementarily to a handlebar's portion to which said body is to be fixed, and said piston is provided with one or more ports for connection to said reservoir, said piston being shaped as to close said ports upon its displacement along said chamber, the apparatus being characterized in that an idle stroke of said piston inside said chamber is adjustable by a rotation of said piston about a longitudinal axis of said piston.

20. An apparatus according to claim 19, wherein said apparatus includes a lid adapted to said reservoir.

21. An apparatus for controlling brakes in bicycles, comprising:

a pump connected with a relevant reservoir for a fluid of a hydraulic circuit of the apparatus, wherein said reservoir is disposed inside a containment body having a defined open side, the entirety of said open side facing opposite a handlebar portion to which said body is to be fixed.

22. An apparatus according to claim 21, comprising a concave portion shaped complementarily to the handlebar's portion to which the said body is to be fixed.

23. An apparatus according to claim 21, wherein said reservoir has a lid.

24. An apparatus according to claim 22, wherein said concave portion makes up a lid of the reservoir.

* * * * *